Figure 1:
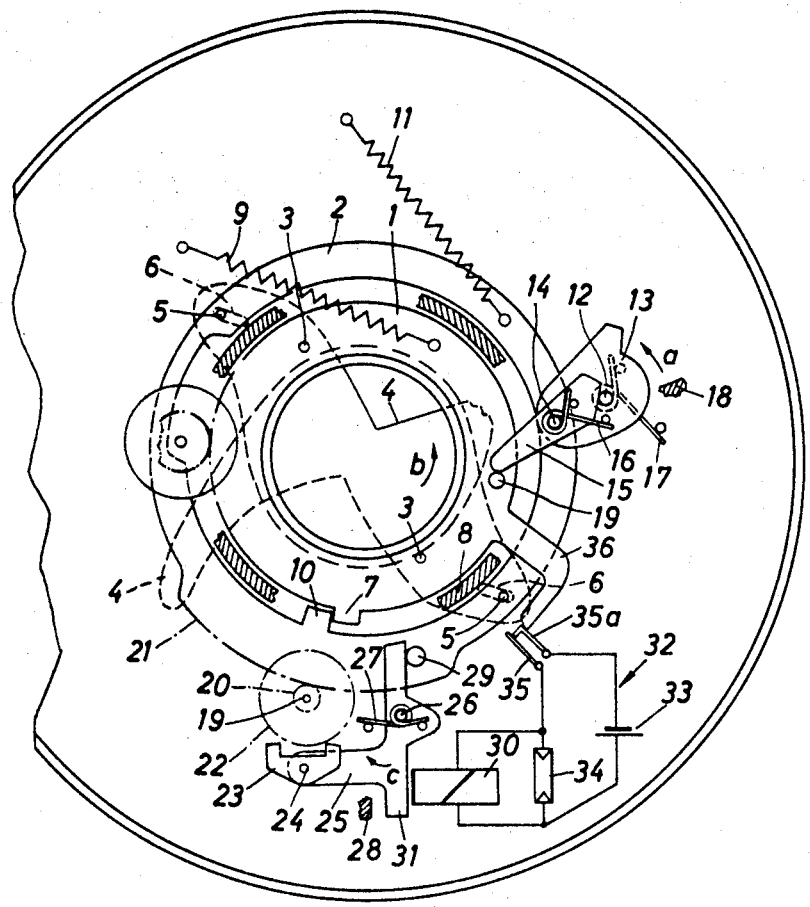

Sept. 10, 1968  G. KIPER  3,400,645
CENTRAL PHOTOGRAPHIC SHUTTER
Filed Feb. 8, 1966  2 Sheets-Sheet 1

INVENTOR.
DR. GERD KIPER
BY
Connolly and Hutz
ATTORNEYS

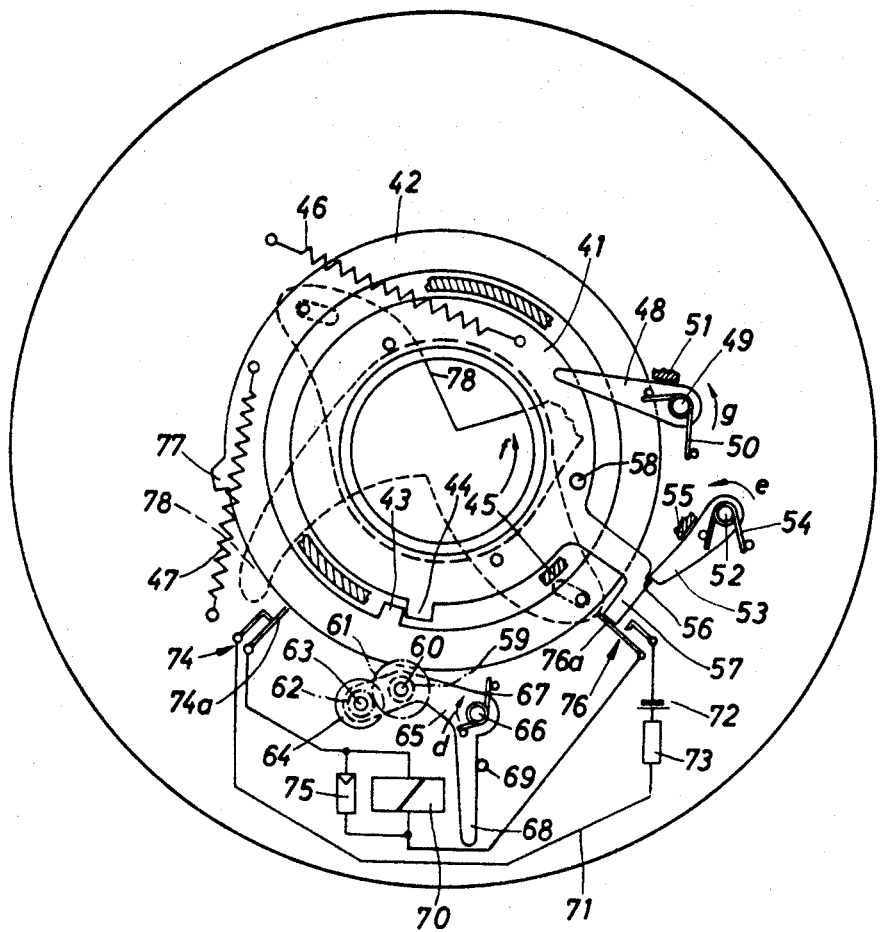

United States Patent Office 3,400,645
Patented Sept. 10, 1968

3,400,645
CENTRAL PHOTOGRAPHIC SHUTTER
Gerd Kiper, Unterhaching, near Munich, Germany, assignor to Agfa-Gevaert Aktiengesellschaft, Leverkusen, Germany
Filed Feb. 8, 1966, Ser. No. 525,882
Claims priority, application Germany, Feb. 13, 1965, A 48,394
12 Claims. (Cl. 95—10)

This invention relates to a central photographic shutter in which the shutter sectors are open and closed by changing the angular phase between the pair of concentric rings to which they are operatively connected, and it more particularly relates to such a shutter in which the operating rings commence their driven movement and one of them is retarded to control the shutter opening time and pattern.

In U.S. Patent No. 3,099,197 is shown a central photographic shutter in which the exposure time is effected by retarding one of a pair of simultaneously moving sector rings. In the above patent a retarding device acts upon the shutter closing ring to retard its motion to momentarily vary the angular relationship between it and the shutter-opening ring after they are released. The sectors open while the rings are out of phase and then close when they come back into phase at the end of the movement to provide the desired shutter-opening time. Variations of this arrangement are described in copending applications Ser. No. 346,251, filed Feb. 20, 1964, now Patent No. 3,273,481 and Ser. No. 346,340, filed Feb. 20, 1964, now Patent No. 3,267,829.

An object of this invention is to provide a central photographic arrangement of the above type having an exposure control mechanism wherein by a very slight variation of the increasing or decreasing delaying action of a retarding switch circuit at the diaphragm shutter, a larger number of various exposure values giving exposure-time-diaphragm pairings can be adjusted.

A further object is to provide such a control mechanism which makes possible the achieving of a control over a large brightness range, even with very simply constructed retarding switch circuits, which have only passive elements such as light-sensitive receivers and if necessary resistors, but not capacitors.

In accordance with this invention, these objects are achieved by utilizing the following characteristics:

A central shutter constructed as a diaphragm shutter with two simultaneously released shutter members, running off synonymously or concurrently, which control the sectors in such a manner that an advance of the first shutter member actuates the opening and an advance of the second shutter member actuates the closing of the sectors;

A delay switch circuit with a source of current, a variable resistance, preferably al ight-sensitive receiver, and a delaying operating or breaking electric control magnet corresponding to the adjustment of the variable resistance or corresponding to the brightness-releated resistance value of the light-sensitive receiver; and an arresting arrangement connected to the second shutter member by means of the electric control magnet during the running time of the first shutter member, engaged with the second member from the time of connection until the end of the run-off of the second shutter member.

The retarding arrangement can advantageously consist of a mass or lever arresting mechanism, which as a whole, can be connected to the second shutter member, preferably by means of a friction wheel connection.

According to another embodiment of the invention, the retarding arrangement is constructed as a lever escapement, whose ratchet wheel is permanently connected with the second shutter member in a synchronized connection, while the escapement can be switched on during the run-off of the second shutter member.

FIG. 1 is a sectional view in elevation taken through a shutter which is one embodiment of this invention; and FIG. 2 is a sectional view similar to FIG. 1 of another embodiment of this invention.

The shutter shown in FIG. 1 includes a housing having two shutter members 1, 2 constructed as two individually pivotable sector rings. Shutter member 1 carries two pins 3 with shutter sector 4 being swingably supported at each pin. Shutter member 2 also carries two pins 5 which are each engaged in a slot 6 of a shutter sector 4. Shutter sectors 4 can therefore move reciprocally in relative movements of the shutter members 1, 2. For the sake of clarity only two shutter sectors are shown. However, three or more sectors may also be employed. Shutter member 1 additionally carries stop 7 which interacts with a fixed counterstop 8 for limiting the turning movement of the shutter member 1 under the influence of its driving spring 9. Furthermore, the shutter member 2, which is driven by its own driving spring 11, carries a stop 10 which interacts with stop 7.

For cocking and releasing of the described automatic shutter, a cocking and releasing lever 13 is mounted on a shaft 12. Shaft 12 is connected to a direct cocking and releasing handle (not shown). The cocking and releasing lever 13 supports a lug 14 around which pivots a cocking and releasing lever 15 which is in an abutting position to a section of shaft 12. Another spring 17 is connected to the cocking and releasing lever 13 for urging the lever 13 in the opposite direction of arrow a, toward stationary stop 18. For the movement of shutter member 1, the cocking and releasing latch 14 interacts with a stop pin 19 on member 1 in a direction opposite that shown by arrow b.

For the achievement of a designated largest, free penetration opening for the exposure path of rays which release the sectors during an exposure, and for the simultaneous achievement of various opening times, a retarding arrangement is provided which is activated at various times during the run-off of the shutter member 2 and remains effective to the end of the run-off movement of the shutter member. This retarding arrangement includes a pinion 20 rotating around stationary pin 19 and which is in constant connection with gearing 21 of member 2. An escapement ratchet wheel 22 is fixed to pinion 20. Escapement ratchet wheel 22 can interact with an escapement member 23 which in turn pivots about pin 24 of an adjustable lever 25. The adjustable lever 25 in turn pivots on pin 26. By a turning of the adjustable lever 25, escapement 23 can either be turned to the ratchet wheel 22 or be lifted past it. A spring 27 engages with adjustable lever 25 and urges the lever 25 so that escapement 23 is in turn urged toward ratchet wheel 22. In this position the adjustable lever 25 abuts fixed stop 28. Adjustable lever 25 can be lifted away from stop 28 either by means of a control lug 29 of the shutter member 1 in its cocking movement or by means of an electric control magnet 30 whose movable escapement is formed by lug 31 of the adjustable lever 25.

A retarding switch circuit, which is generally designated by 32, is provided for the control of the electric control magnet 30. The retarding switch circuit includes (in sequence) a source of current 33, a light-sensitive receiver 34, preferably constructed as a photoelectric resistor, and a control switch 35 whose movable contact 35a is constructed to be springy in such a manner that it normally assumes a position in which switch 35 is open. A control projection 36 of the shutter member 1 serves to close the switch 35.

Shutter member 1 should have a run-off time of 20 milliseconds in a diaphragm shutter, for example, where exposure time-aperture pairings are adjustable between the values aperture 2.8 $\frac{1}{30}$ sec. on the one hand and aperture 22 $\frac{1}{250}$ sec. on the other hand. In order to achieve this, a retarding mechanism is not absolutely necessary, where driving spring 9 is of normal construction. If desired spring 9 can be made stronger so that uniformly functioning retarding mechanism for shutter member 1 can be arranged along the entire run-off distance. In this type of construction of the shutter, the provided control over nine light steps can occur by varying the increasing or decreasing delaying action of the electric control magnet at about 10-15 milliseconds.

In order to make an exposure, shaft 12, and thus also, the cocking and release lever 13, are rotated in the direction of arrow a. Cocking and release lever 15 moves along with lever 13, to in turn move shutter member 1 by means of stop pin 19 in the direction opposite to that of arrow b. Driving spring 9 is thus cocked. Shutter member 1 in turn moves shutter member 2 in the same direction by means of stops 7 and 10, whereby driving spring 11 for member 2 is also cocked. Immediately, before the separation of the cocking and release lever 15 from the stop pin 19, control lug 29 moves toward adjustable lever 25 and swings it to such an extent that there remains only a small residual air slot or gap between lug 31 and the electric control magnet 30. As a result, even with a slight agitation and a very short operation of the electrical control magnet 30, the adjustable lever 25 can be held with certainty by the electric control magnet 30 in a position in which the escapement is lifted past the ratchet wheel 22. On the other hand, before the separation of the cocking and release lever 15 from pin 19, control lug 36 moves contact 35a of switch 35 and to close the switch. Thus the current flows in circuit 32 which leads to operation of the electric control magnet 30 and thus to the complete advance of lug 31 of the adjustable lever 25.

As soon as the cocking and release lever 15 separates from the stop pin 19, both shutter members 1, 2 run off under the effect of their driving springs 9, 11 in the direction of arrow b. This does not yet change the position of the shutter secors 4 shutting off the penetration opening for the paths of rays because of their reciprocal overlap. After a short part of the return movement, the control lug 36 releases control switch 35. The flow of current in the retarding switch circuit 23 is disrupted. Only a compensating current flows through the electric control magnet 30 and the light sensitive receiver 34. The greater the resistance value of the light-sensitive receiver 34, the lower the exposure brightness and the quicker is this compensating current used up. As soon as the still flowing compensating current is lower than the retaining current, the control magnet 30 releases lug 31 of the adjustable lever 25. Lever 25 then rotates in the direction of arrow c under the effect of spring 27 until lug 31 abuts lug 28 and escapment 23 is engaged with escapment ratchet wheel 22. The run-off speed of shutter member 2 is thereby intensely retarded by the retarding mechanism 20-24 as compared to the run-off speed of shutter member 1. Shutter member 1 thus advances in relation to member 2. This relative movement produces a swinging action of shutter sectors 4 around pin 3, which leads to an opening of the course of beam.

If, for example, the exposure brightness is low, then shortly before the start of the run-off of the shutter members 1, 2 the retarding mechanism 20-24 is completely activated. In this case shutter sectors 4 are completely opened and thus free the exposure course over almost the entire retarded run-off duration of the sector ring 2. The exposure thereof takes place with a large diaphragm opening and a relatively long exposure time, hence with a diaphragm set at 2.8 and $\frac{1}{30}$ sec.

With increased exposure brightness, escapment 24 is switched in at a later stage so that shutter sectors 4 on the one hand can no longer be completely opened, and on the other hand the exposure course of the light beam is freed only for a short duration of time. An exposure is thus achieved with a small diaphragm opening and a short duration of exposure time.

The arrangement shown in FIG. 2 includes a diaphragm shutter constructed as a spring shutter and a retarding switch current operating with increasing delay.

As in the arrangement of FIG. 1, that of FIG. 2 includes two shutter members 41, 42 which control shutter sectors 78. For the mutual synchronization during the cocking movement, shutter members 41, 42 carry lugs 43, 44 of which lug 44 in addition can interact with a fixed counter-lug 45 for the limitation of the run-off course of the shutter member 41. A driving spring 46 and 47 engages with the two shutter members 41, 42, respectively.

A tension lever 48 is provided for cocking of the shutter and is fixed on a tension shaft 49. Shaft 49 can be activated by means of a transmission (not shown). Tension lever 48 is engaged with a return spring 50 which urges lever 48 in an abutting position against a stationary lug 51. Tension lever 48 can interact with a lug pin 58 of shutter member 41. For releasing the shutter, there is provided a release lever 53 mounted on a release shaft 52 and being held in an abutting position against a fixed stop 55 by means of spring 54. Release shaft 52 is similarly connected rigidly or synchronously with a release means not shown here. In the cocked setting of the shutter shown in FIG. 2, the release lever 53 is situated behind stop surface 56 of a control lug 57 of the shutter member 41 and therefore maintains this member in the cocked position against the effect of the driving spring 46.

The retarding arrangement for delaying the run-off of the shutter member 42 is constructed as a mass retarding mechanism in this arrangement. The mass retarding mechanism utilizes a friction wheel 59 which is connected with a fixed mass wheel 61 by means of shaft 60. Mass wheel 61 is connected by means of a gearing with a pinion 62, which in turn is connected with a second mass wheel 64 by means of shaft 63. Shafts 60, 63 are supported on an adjustable lever 65. Adjustable lever 65 rotates about a fixed pin 66 and is under the effect of a spring 67 which urges arm 68 of the adjustable lever 65 in an abutting position against the fixed stop pin 69. Arm 68 in turn forms the movable escapment of an electric control magnet 70. By swinging the adjustable lever 65, ratchet wheel 59 can be moved against the necessarily roughened outer circumference of the annular shutter member 42. This produces a driving connection between shutter member 42 and retarding mechanism 59-64.

The electric control magnet 70 is controlled by means of a delayed action switch circuit 71, which includes (in sequence) a source of current 72, a fixed resistor 73, an operating switch 74, a light-sensitive receiver 75 and a control switch 76. Operating switch 74 has a movable contact 74a which is normally in such a position that switch 74 is open. Switch 74 can be opened by means of a control lug 77 of the shutter member 42 which is disposed for contacting and moving arm 74a. Control switch 76 also has a movable contact 76a which normally maintains switch 76 close. From this closed setting, contact 76a can be displaced by advancing the control lug 57 of shutter member 41. Even in this switching the electric control magnet 70 is parallel to the light-sensitive receiver 75.

FIG. 2 shows the arrangement after cocking of the shutter. If release shaft 52 with release lever 53 is moved in the direction of arrow $e$, the lever 53 releases the lug surface 56. Now the shutter member 41 can run off under the effect of the operating spring 46 in the direction of arrow $f$. Shutter member 42 can follow this movement under the effect of its driving spring 47. Immediately after the initiation of the run-off of the shutter member 41, its control lug 57 releases the movable contact 72a so that the delayed action switch circuit 71 is closed. In a low exposure brightness, the light-sensitive receiver 75 has a great resistance value, so that the current flows essentially only through the electric control magnet 70. This reacts relatively quickly and in addition pulls arm 68, which thus acts as an escapement. Adjustable lever 65 thereby rotates in the direction of the arrow $d$, so that friction wheel 59 contacts the outer circumference of shutter member 42. As soon as the retarding mechanism 59–64 is moved, the run-off of shutter member 42 is delayed so that as a result of the relative movement between the two shutter sectors 42, 41, sectors 78 can open. If the retarding action of the retarding mechanism 59–64 takes affect in an early stage, the sectors allow considerable access at a relatively long time for the exposure course of the beam. With more exposure brightness, the retarding mechanism 59–64, however is moved to the sector ring at a later stage by operating the electric control magnet 70, so that the entire opening for the beam passage is no longer made available by sectors 43, and consequently the duration of exposure is also shorter.

At the end of the run-off movement of shutter member 42, its control lug 77 strikes against movable contact 74a, thereby opening operating switch 74, so that current is interrupted in the delayed action switch circuit 71.

For obtaining a new exposure, tension shaft 49 with tension leverd 48 is rotated in the direction of arrow $g$. Tension lever 48 then carries shutter member 41 along with it in the direction opposite that of arrow $f$ by means of stop pin 58. Shutter member 42 follows this movement by means of lug coupling 43, 44 until both members 41, 42 again take the position, shown in FIG. 2, in which the release lever 53 has dropped behind stop surface 56, and the delayed action switch circuit 71 is again interrupted by the opening of control switch 76.

Aside from the possibilities of achieving (with slight variations of the switching times of the electric control magnet) settings of exposure time and of the diaphragm for a large exposure area, a further considerable advantage of the inventive arrangement lies in that the control lever, interacting with the electric control magnet and constructed as an escapment, has no retaining function to take over for either of the two-spring-loaded shutter members 41, 42. Accordingly, in the movement of the control lever, no additional force is necessary, which would be required for instance if the rubbing between a retaining lever (activated by an electric control magnet) and a shutter member (which is under the effect of a driving spring) must be overcome. This makes possible not only a weaker and thus smaller construction of the electric control magnet but also avoids deviations of the switching instances.

The invention is not limited to the examples shown. Other, especially constructed simple delay switch circuits can be employed. For simple cameras, a single sector can also be used, if necessary with a fixed covering of the objective light beam. It is also especially possible to utilize a potentiometer or staggered fixed resistors, instead of the light-sensitive photoelectric resistance, e.g. with simple cameras without automatic exposure control with built-in flash units and batteries.

Obviously, many modifications and variations of the present invention are possible in the light of the above teachings. It is, therefore, to be understood that within the scope of the appended claims the invention may be practiced otherwise than as specifically described.

What is claimed is:

1. In a photographic shutter of the central type including a housing, a pair of rotatably mounted sector operating rings in said housing, said rings being an opening ring and a closing ring, a number of shutter sectors, each of said shutter sectors being movably connected to both of said rings to cause said rings to open and close said sectors when the angular phase between said rings varies from the normal condition and returns to it, exposure control means for varying said angular phase between said rings, said exposure control means including a delay switch circuit having retarding affecting magnetic means, variable means in said circuit for adjusting the strength of said magnetic means, arresting means operatively associated with said closing ring for governing its angular velocity, and said magnetic means controlling the operative time of retarding action of said arresting means.

2. In a photographic shutter as set forth in claim 1 wherein said arresting means includes an arresting mechanism, and a friction wheel mechanism connecting said arresting mechanism to said closing ring.

3. In a photographic shutter as set forth in claim 1 wherein said arresting means includes an escapement mechanism having an escapement ratchet wheel in permanent locked-in contact with said closing ring, and said magnetic means being arranged for actuating said escapement mechanism during the run-off of said closing ring.

4. In a photographic shutter as set forth in claim 1 wherein said arresting means includes a lever disposed near and resiliently biased away from said magnetic means, and said magnetic means being disposed and arranged for drawing said lever into contact with said magnetic means when said circuit is closed to effect the retarding action of said closing ring.

5. In a photographic shutter as set forth in claim 1 wherein said circuit includes a control switch, said magnetic means being disposed and arranged for actuating said arresting means when said control switch is open, said arresting means including a lever disposed for positioning adjacent said magnetic means, and said closing ring having a control lug which is disposed for moving said lever adjacent said magnetic means during the cocking of said rings.

6. In a photographic shutter as set forth in claim 5 wherein said shutter is constructed as an automatic shutter, and said opening ring having a projection for closing said control switch before said opening ring begins its run-off.

7. In a photographic shutter as set forth in claim 1 wherein said circuit includes a control switch, said magnetic means being disposed and arranged for actuating said arresting means when said control switch is closed, and said first ring having a control lug disposed for maintaining said control switch open in the cocked position of said opening ring and for closing said switch at the beginning of the run-off of said opening ring.

8. In a photographic shutter as set forth in claim 7 wherein said circuit includes a driving switch, and said second ring having a projection for opening said driving switch during the run-off of said second ring.

9. In a photographic shutter as set forth in claim 1 wherein said variable means comprises a variable resistance, said circuit including a control switch and a source of current, and said variable resistance being connected in line with said control switch and said source of current and parallel to said magnetic means.

10. In a photographic shutter as set forth in claim 9 wherein said circuit includes a fixed resistance having a time delay response, and said fixed resistance being in line with said control switch and said variable resistance.

11. In a photographic shutter as set forth in claim 1 wherein said magnetic means is disposed and arranged for actuating said arresting means to retard said closing ring from the time of actuation until the end of the run-off of said closing ring, and said variable means being a variable resistance.

12. In a photographic shutter as set forth in claim 11 wherein said variable resistance is a photoelectric resistance which acts as a light-sensitive receiver.

References Cited

UNITED STATES PATENTS

| 3,309,978 | 3/1967 | Kiper | 95—63 |
| 3,335,649 | 8/1967 | Kiper | 95—63 XR |
| 3,362,311 | 1/1968 | Singer. | |

NORTON ANSHER, *Primary Examiner.*

J. F. PETERS, *Assistant Examiner.*